US012803321B2

(12) United States Patent
Shen et al.

(10) Patent No.: US 12,803,321 B2
(45) Date of Patent: Nov. 17, 2026

(54) POWER CONVERTERS AND UNINTERRUPTIBLE POWER SUPPLIES (UPSS) INCLUDING THE SAME

(71) Applicant: Santak Electronic (Shenzhen) Co., Ltd., Shenzhen (CN)

(72) Inventors: Zhimin Shen, Shenzhen (CN); Lei Cao, Shenzhen (CN); Dongdong Yang, Shenzhen (CN); Binchuang Zhu, Shenzhen (CN)

(73) Assignee: Santak Electronic (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 19/087,867

(22) Filed: Mar. 24, 2025

(65) Prior Publication Data

US 2025/0309676 A1 Oct. 2, 2025

(30) Foreign Application Priority Data

Mar. 28, 2024 (CN) ......................... 202410367301.1

(51) Int. Cl.

| | |
|---|---|
| ***H02J 9/06*** | (2006.01) |
| ***H02M 3/158*** | (2006.01) |
| ***H02M 7/17*** | (2006.01) |
| ***H02M 7/219*** | (2006.01) |

(52) U.S. Cl.

CPC ........... *H02J 9/061* (2013.01); *H02M 3/1588* (2013.01); *H02M 7/17* (2013.01); *H02M 7/219* (2013.01)

(58) Field of Classification Search

CPC ........ H02J 9/061; H02M 3/1588; H02M 7/17; H02M 7/219

USPC ........................................................... 307/66

See application file for complete search history.

(56) References Cited

U.S. PATENT DOCUMENTS 8,193,662 B1 * 6/2012 Carlson ..................... G06F 1/30 307/64
2025/0167584 A1 * 5/2025 Liu ......................... H02J 7/855

* cited by examiner

*Primary Examiner* — Michael R. Fin
(74) *Attorney, Agent, or Firm* — Stanek Lemon Crouse & Meeks, PA

(57) ABSTRACT

A power converter and an UPS including the same are provided. The power converter includes a first and second switching modules, and a first and second power conversion modules. Each of the first and second power conversion modules includes two bridge arms. The first switching module is configured to cause an input terminal of the first power conversion module to be selectively electrically connected to a DC power supply or a first phase of an AC power supply, the second switching module is configured to cause an input terminal of the second power conversion module to be selectively electrically connected to the DC power supply or a second phase of the AC power supply, and the first and the second power conversion modules are configured to cause the two bridge arms to independently perform AC-DC conversion, or configured to cause the two bridge arms to cooperatively perform DC-DC conversion.

10 Claims, 8 Drawing Sheets

POWER CONVERTERS AND UNINTERRUPTIBLE POWER SUPPLIES (UPSS) INCLUDING THE SAME

CROSS-REFERENCE TO RELATED APPLICATION

This application claims priority to Chinese Patent Application No. 202410367301.1, filed Mar. 28, 2024, the content of which is hereby incorporated herein by reference in its entirety.

TECHNICAL FIELD

The present inventive concept relates generally to the field of power supplies, and in particular, to a power converter and an uninterruptible power supply (UPS) including the power converter.

BACKGROUND

An uninterruptible power supply (UPS) is generally used to instantaneously switch to providing continuous power to a load from a backup power supply (e.g., a rechargeable battery) when a primary power supply (e.g., a mains power grid) is not in a normal state, to protect the load from damage due to power interruption of the primary power supply. The UPS typically includes an AC-DC conversion module (rectifier) that converts an alternating current into a direct current, a DC-AC conversion module (inverter) that converts a direct current into an alternating current, a backup power supply, a DC-DC conversion module (charger) that supplies power to the backup power supply, and a DC-DC conversion module (battery converter) that performs direct current conversion on an output voltage of the backup power supply.

When the primary power supply fails, the UPS switches a system from operating with the primary power supply to operating with the backup power supply. When the primary power supply resumes operation, the UPS switches the system from operating with the backup power supply to operating with the primary power supply.

A conventional UPS generally uses a dedicated circuit module to implement functions such as AC-DC conversion, DC-DC conversion, and direct current bus balancing, resulting in a low circuit utilization, a large volume, high costs, and a poor stability for the entire UPS.

SUMMARY

Therefore, the present inventive concept aims to overcome the foregoing disadvantages of the conventional technology, and provides a power converter including a first switching module, a second switching module, a first power conversion module, and a second power conversion module, each of the first power conversion module and the second power conversion module including two bridge arms, where the first switching module is configured to cause an input terminal of the first power conversion module to be selectively electrically connected to a direct current power supply or a first phase of an alternating current power supply, the second switching module is configured to cause an input terminal of the second power conversion module to be selectively electrically connected to the direct current power supply or a second phase of the alternating current power supply, and the first power conversion module and the second power conversion module are configured to cause the two bridge arms thereof to independently perform AC-DC conversion, to supply power to a direct current bus from the alternating current power supply, or configured to cause the two bridge arms thereof to cooperatively perform DC-DC conversion, to supply power to the direct current bus from the direct current power supply.

According to the power converter of the present inventive concept, a third switching module and a third power conversion module are further included, wherein the third power conversion module is a DC-DC conversion module, the third switching module is configured to control connection and disconnection between the direct current power supply and an input terminal of the third power conversion module, and an output terminal of the third power conversion module is electrically connected to the direct current bus.

According to the power converter of the present inventive concept, a heavy-load operating mode is included, wherein when the alternating current power supply is normal, under a heavy-load condition, the first power conversion module and the second power conversion module are configured to perform AC-DC conversion, while the third power conversion module is configured to perform DC-DC conversion, and the alternating current power supply and the direct current power supply jointly supply power to the direct current bus.

According to the power converter of the present inventive concept, when the alternating current power supply is abnormal, at least one of the first power conversion module and the second power conversion module is configured to perform DC-DC conversion; or, when the alternating current power supply is abnormal, at least one of the first power conversion module and the second power conversion module is configured to perform DC-DC conversion, while the third power conversion module is configured to perform DC-DC conversion.

According to the power converter of the present inventive concept, during a switching period when the first power conversion module and the second power conversion module are configured to switch from DC-DC conversion to AC-DC conversion, the third power conversion module is configured to perform DC-DC conversion.

According to the power converter of the present inventive concept, a fourth switching module and a fourth power conversion module are further included, the fourth power conversion module including two bridge arms, wherein the fourth switching module is configured to cause an input terminal of the fourth power conversion module to be selectively electrically connected to a neutral line or a third phase of the alternating current power supply, and the fourth power conversion module is configured to cause the two bridge arms thereof to independently perform AC-DC conversion, to supply power to the direct current bus from the third phase of the alternating current power supply, or configured to cause the two bridge arms thereof to independently perform balancing of the direct current bus.

According to the power converter of the present inventive concept, the first power conversion module, the second power conversion module, or the fourth power conversion module includes a first bridge arm, a second bridge arm, a first inductor, and a second inductor, wherein the first bridge arm includes a first transistor and a second transistor connected in series, and a node between the first transistor and the second transistor is electrically connected to a first terminal of the first inductor;

the second bridge arm is connected in parallel with the first bridge arm and includes a third transistor and a fourth transistor connected in series, and a node between the third transistor and the fourth transistor is electrically connected to a first terminal of the second inductor;

a second terminal of the first inductor and a second terminal of the second inductor are input terminals of the first power conversion module, the second power conversion module, or the fourth power conversion module; and a node between the first transistor and the third transistor is electrically connected to a positive electrode of the direct current bus, and a node between the second transistor and the fourth transistor is electrically connected to a negative electrode of the direct current bus.

According to the power converter of the present inventive concept, the first transistor and the second transistor are configured to be alternately turned on, or the third transistor and the fourth transistor are configured to be alternately turned on, thereby performing the AC-DC conversion.

According to the power converter of the present inventive concept, the first transistor and the fourth transistor of the first power conversion module or the second power conversion module are configured to be turned on, while the second transistor and the third transistor of the first power conversion module or the second power conversion module are configured to be turned off, thereby performing the DC-DC conversion; or the second transistor and the third transistor of the first power conversion module or the second power conversion module are configured to be turned on, while the first transistor and the fourth transistor of the first power conversion module or the second power conversion module are configured to be turned off, thereby performing the DC-DC conversion.

The present inventive concept further provides an uninterruptible power supply, including the power converter according to the present inventive concept.

Compared with the conventional technology, the power converter of the present inventive concept has a simple circuit topology, a small volume, low costs, and a high circuit utilization.

BRIEF DESCRIPTION OF THE DRAWINGS

The following further describes the embodiments of the present inventive concept with reference to the accompanying drawings, where.

DETAILED DESCRIPTION

To make the objectives, technical solutions, and advantages of the present inventive concept clearer, the following further describes the present inventive concept in detail through the embodiments with reference to the accompanying drawings. It should be understood that the embodiments described herein are only used to explain the present inventive concept, and are not intended to limit the present inventive concept.

Figure 1:
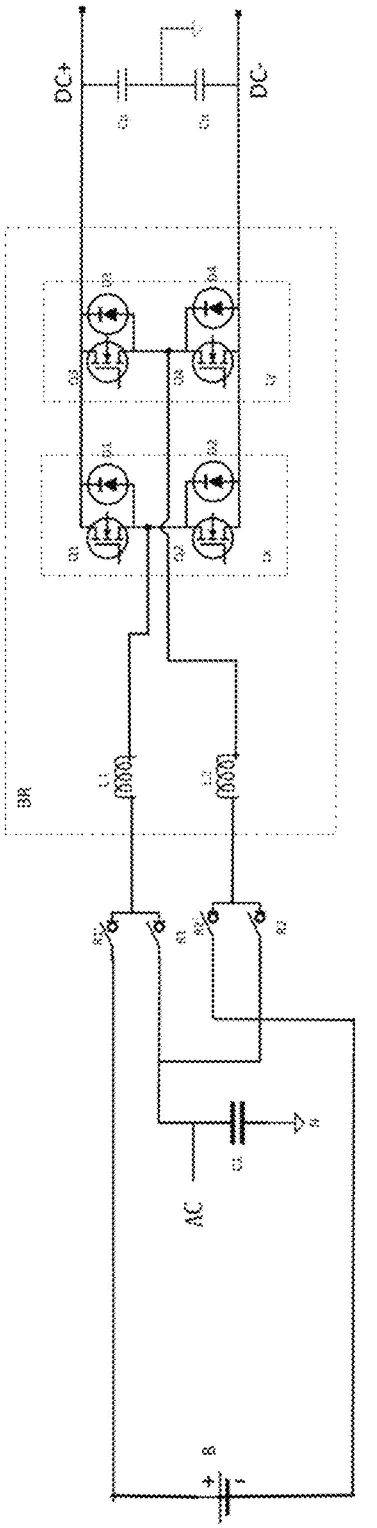
FIG. 1 is a circuit topology of a power converter according to some embodiments of the present inventive concept.

Some embodiments of the present inventive concept provide a power converter whose circuit topology is shown in FIG. 1. The power converter is configured to be electrically connected to an alternating current power supply AC (e.g., a mains supply) and a direct current power supply B (e.g., a rechargeable battery). The power converter includes a power conversion module BR. Relays R1 and R2 control connection and disconnection between the alternating current power supply AC and the power conversion module BR. Relays R1' and R2' control connection and disconnection between the direct current power supply B and the power conversion module BR.

Specifically, the power conversion module BR includes a first inductor L1, a second inductor L2, a first bridge arm Lx electrically connected to the first inductor L1, and a second bridge arm Ly electrically connected to the second inductor L2. The first bridge arm Lx includes a first N-type MOSFET transistor Q1 and a second N-type MOSFET transistor Q2 connected in series, and a first diode D1 and a second diode D2 anti-parallel connected to the first transistor Q1 and the second transistor Q2, respectively. A node where a source of the first transistor Q1 is electrically connected to a drain of the second transistor Q2 is connected to a first terminal of the first inductor L1. A second terminal of the first inductor L1 is configured to be electrically connected to the alternating current power supply AC through the relay R1 or electrically connected to a positive electrode of the direct current power supply through the relay R1'. The second bridge arm Ly includes a third N-type MOSFET transistor Q3 and a fourth N-type MOSFET transistor Q4 connected in series, and a third diode D3 and a fourth diode D4 anti-parallel connected to the third transistor Q3 and the fourth transistor Q4, respectively. A node where a source of the third transistor Q3 is electrically connected to a drain of the fourth transistor Q4 is connected to a first terminal of the second inductor L2. A second terminal of the second inductor L2 is configured to be electrically connected to the alternating current power supply AC through the relay R2 or electrically connected to a negative electrode of the direct current power supply through the relay R2'. A node between a drain of the first transistor Q1 and a negative electrode of the first diode D1 is electrically connected to a node between a drain of the third transistor Q3 and a negative electrode of the third diode D3 and is electrically connected to a positive direct current bus DC+, and a node between a source of the second transistor Q2 and a positive electrode of the second transistor D2 is electrically connected to a node between a source of the fourth transistor Q4 and a positive electrode of the fourth diode D4 and is electrically connected to a negative direct current bus DC−. A node between a positive direct current bus capacitor Cp and a negative direct current bus capacitor Cn is connected to a neutral line N (e.g., grounded or not grounded). An output terminal of the alternating current power supply AC is connected to the neutral line N through a filter capacitor C1. Those skilled in the art can understand that a MOSFET may implement bidirectional current conduction, that is, a current from a source to a drain or a current from a drain to a source. In addition, a diode anti-parallel connected to each transistor may be disposed inside the MOSFET, and is configured to implement freewheeling of a switching gap of transistors.

Operating modes of the power converter in these embodiments are as follows:

Mains supply mode (the mains supply operates normally): The relays R1 and R2 are closed, and the relays R1' and R2' are open. In this case, the first inductor L1 and the first bridge arm Lx or the second inductor L2 and the second bridge arm Ly constitute an AC-DC converter. Pulse width modulation (PWM) control signals are provided to gates of the transistors Q1 to Q4 to implement turn-on and turn-off of the transistors to implement AC-DC conversion, thereby supplying power from the alternating current power supply to the direct current bus capacitors Cp and Cn. The PWM control signals may be provided by a dedicated controller, for example, the controller may be configured to include a processing circuit that performs turn-on/turn-off driving control of each MOSFET transistor. The processing circuit may include digital electronic circuits such as an operation processing apparatus and a storage apparatus, may include analog electronic circuits such as a comparator, an operational amplifier, and a differential amplifier, or may include both digital electronic circuits and analog electronic circuits.

Specifically, refer to current paths shown in FIG. 2 to FIG. 5 when the mains supply supplies power to the direct current bus capacitors. For clarity, a battery and a related circuit connection in a circuit topology are omitted in the figures. In addition, because the first bridge arm Lx and the second bridge arm Ly are parallel power modules and have the same operating mode, the first bridge arm Lx is used as an example for description. For clarity, the second bridge arm Ly and a related circuit connection are also omitted in the figures.

Figure 2:
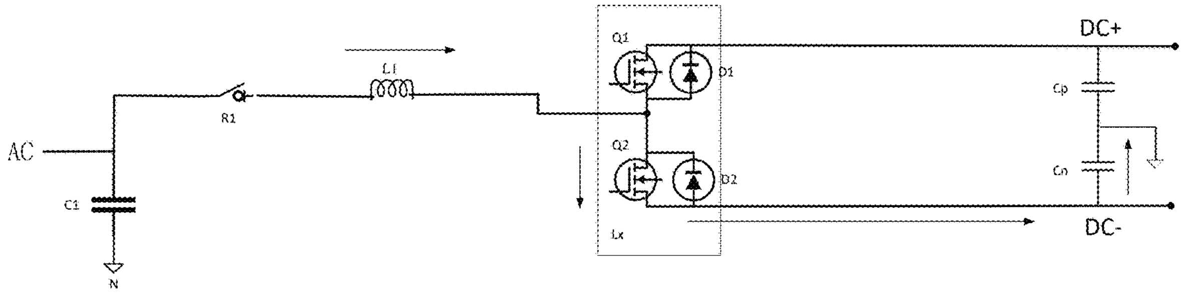
FIG. 2 to FIG. 5 show a current path of the power converter shown in FIG. 1 during AC-DC conversion.
Figure 3:
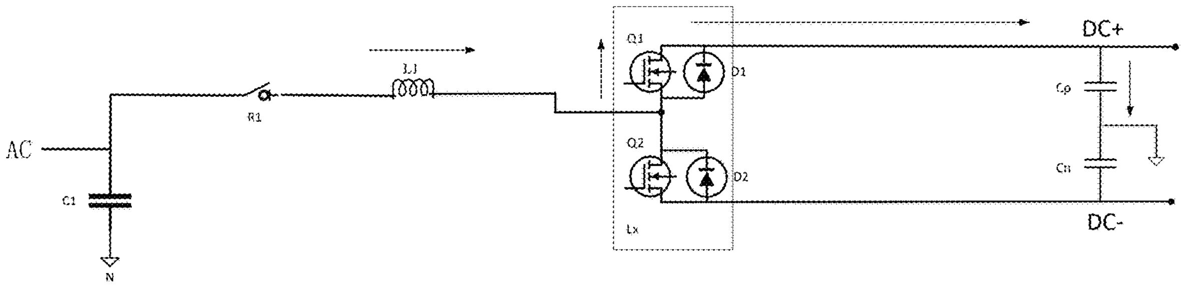

When an input alternating current is in a positive half-cycle, during a first time period, as shown in FIG. 2, the second transistor Q2 of the first bridge arm Lx is controlled to be turned on, the first transistor Q1 of the first bridge arm Lx is controlled to be turned off, and then a current path is: AC→R1→L1→Q2→DC−→Cn→neutral line N. In this case, the inductor L1 stores energy. During a subsequent second time period, as shown in FIG. 3, the first transistor Q1 of the first bridge arm Lx is controlled to be turned on, the second transistor Q2 of the first bridge arm Lx is controlled to is: be turned off, and then a current path AC→R1→L1→Q1→DC+→Cp→neutral line N. In this case, the inductor L1 freewheels. In this way, the first transistor Q1 and the second transistor Q2 are controlled to be alternately turned on, to implement charging of the positive direct current bus capacitor Cp and the negative direct current bus capacitor Cn.

Figure 4:
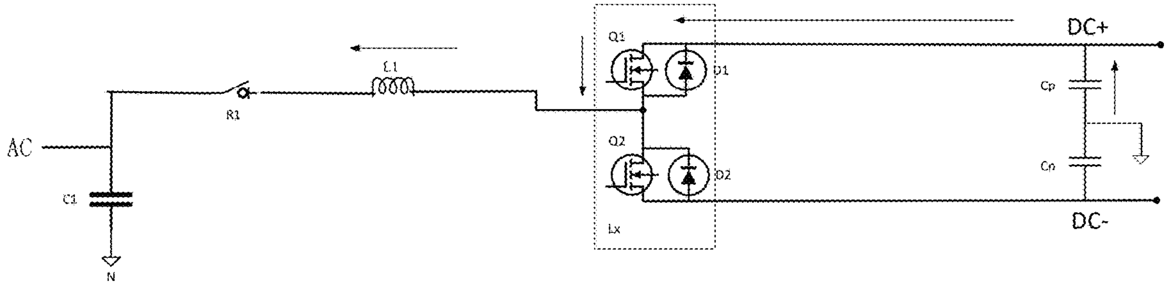
Figure 5:
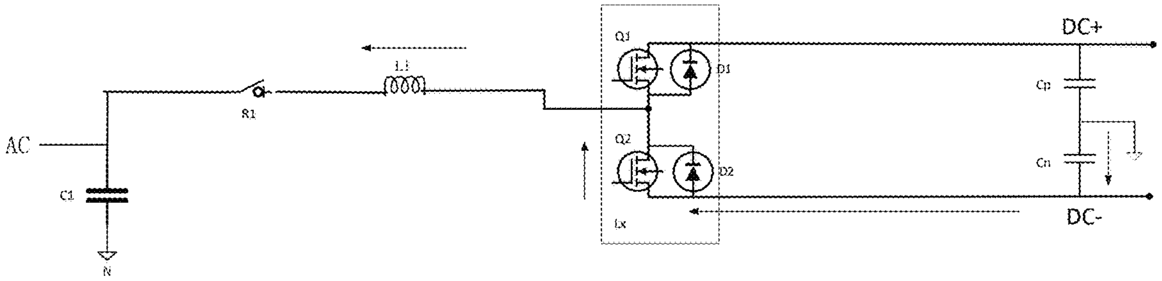

When the input alternating current is in a negative half-cycle, during a first time period, as shown in FIG. 4, the first transistor Q1 of the first bridge arm Lx is controlled to be turned on, the second transistor Q2 of the first bridge arm Lx is controlled to be turned off, and then a current path is: neutral line N→Cp→DC+→Q1→L1→R1→AC. In this case, the inductor L1 stores energy. During a subsequent second time period, as shown in FIG. 5, the second transistor Q2 of the first bridge arm Lx is controlled to be turned on, the first transistor Q1 of the first bridge arm Lx is controlled to be turned off, and then a current path is: neutral line N→Cn→DC−→Q2→L1→R1→AC. In this case, the inductor L1 freewheels. In this way, the first transistor Q1 and the second transistor Q2 are controlled to be alternately turned on, to implement charging of the positive direct current bus capacitor Cp and the negative direct current bus capacitor Cn.

Similarly, for the second bridge arm Ly, PWM control is performed on the third transistor Q3 and the fourth transistor Q4 to implement alternate turn-on, thereby implementing charging of the direct current bus capacitors Cp and Cn.

In these embodiments of the present inventive concept, the first bridge arm Lx and the second bridge arm Ly are independently controlled to implement AC-DC conversion. The first bridge arm Lx and the second bridge arm Ly may be interleaved in parallel, and may perform AC-DC conversion simultaneously.

Battery mode (the mains supply fails): The relays R1 and R2 are open, and the relays R1' and R2' are closed. In this case, the inductors L1 and L2 and the transistors Q1 to Q4 constitute a DC-DC converter. Pulse width modulation (PWM) control signals are provided to gates of the transistors Q1 to Q4 to implement turn-on and turn-off of the transistors to implement DC-DC conversion, thereby supplying power from the direct current power supply to the direct current bus capacitors Cp and Cn. The PWM control signals may be provided by a dedicated controller.

Figure 6:
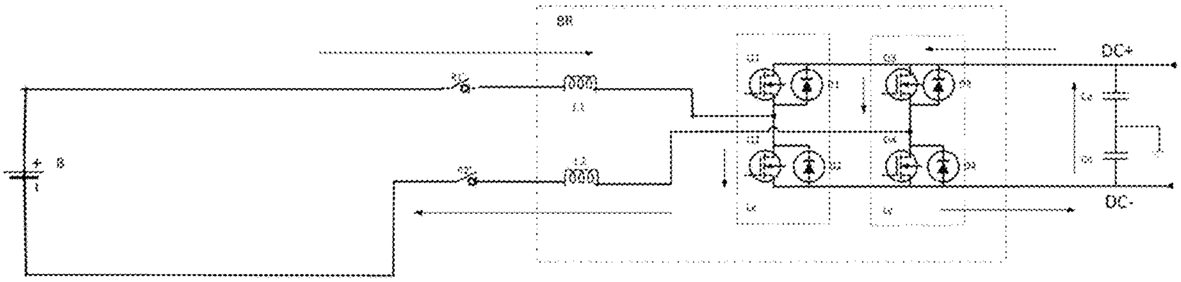
FIG. 6 and FIG. 7 show a current path of the power converter shown in FIG. 1 during DC-DC conversion.
Figure 7:
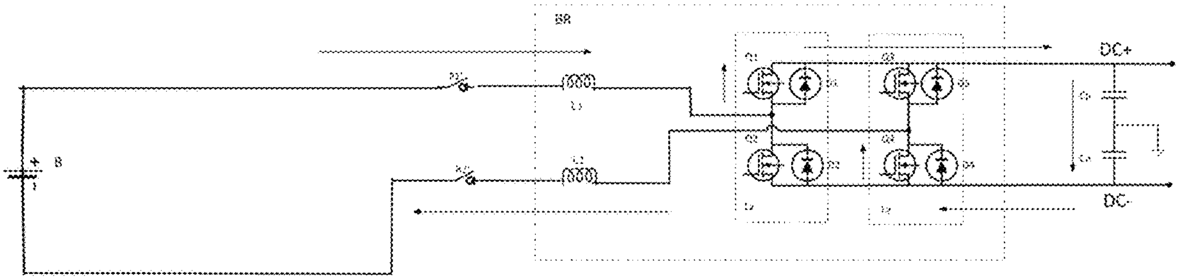

Specifically, refer to two current paths shown in FIG. 6 and FIG. 7 when the battery charges the direct current bus capacitors Cp and Cn. For clarity, the alternating current power supply and a related circuit connection in a circuit topology are omitted in the figures.

First, the second transistor Q2 and the third transistor Q3 are controlled to be turned on, the first transistor Q1 and the fourth transistor Q4 are controlled to be turned off, and then a current path is:

B+→R1'→L1→Q2→DC−→Cn→Cp→DC+→Q3→L2→R2'→B−. As shown in FIG. 6, in this case, the inductors L1 and L2 store energy.

Then, the first transistor Q1 and the fourth transistor Q4 are controlled to be turned on, the second transistor Q2 and the third transistor Q3 are controlled to be turned off, and then a current path is:

B+→R1'→L1→Q1→DC+→Cp→Cn→DC−→Q4→L2→R2'→B−. As shown in FIG. 7, in this case, the inductors L1 and L2 freewheel.

In this way, the charging of the direct current bus capacitors Cp and Cn is implemented, that is, DC-DC conversion is implemented.

The power converter in these embodiments can implement both AC-DC conversion and DC-DC conversion. The circuit topology is simple, costs are low, the volume is small, and the circuit utilization is high. In particular, when the power converter is applied to a UPS, a volume of the UPS can be significantly reduced, the costs of the UPS can be reduced, and the circuit utilization of the UPS can be improved.

Figure 8:
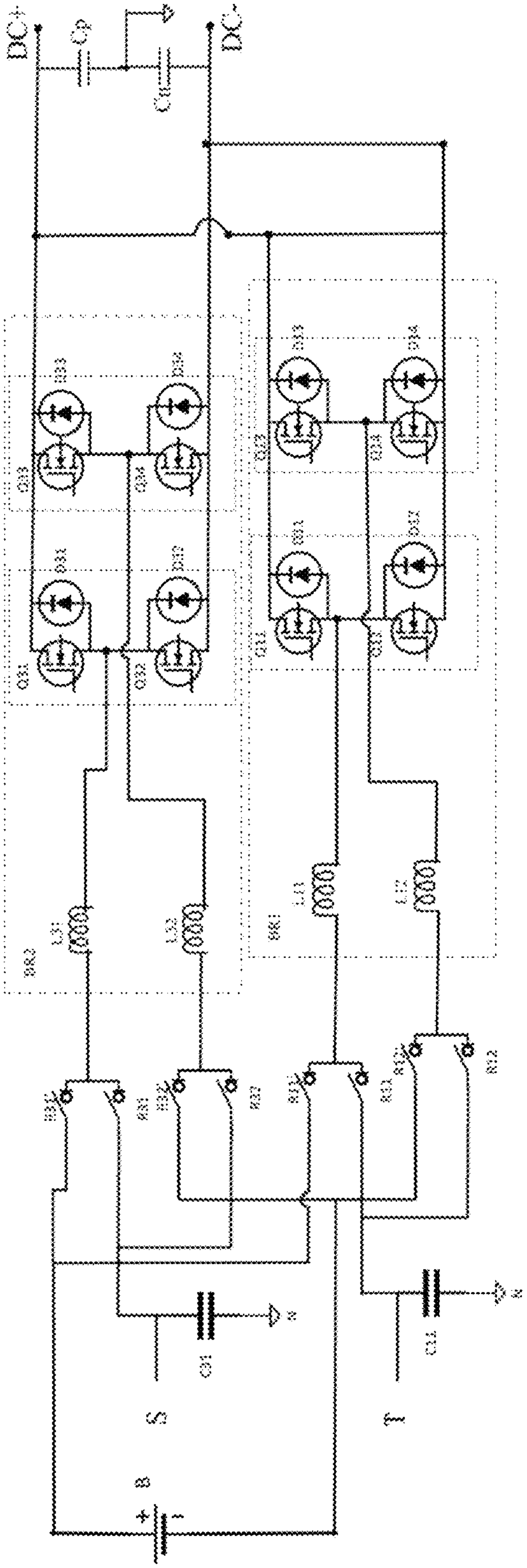
FIG. 8 is a circuit topology of a power converter according to some embodiments of the present inventive concept.

Some embodiments of the present inventive concept provide a two-phase power converter whose circuit topology is shown in FIG. 8. The two-phase power converter includes a first power conversion module BR1 and a second power conversion module BR2, both of which are rectifier modules. A specific circuit topology is the same as the circuit topology of the power conversion module BR shown in FIG.

1. The first power conversion module BR1 and the second power conversion module BR2 correspond to a T phase and an S phase of an alternating current power supply, respectively. Relays R11 and R12 control connection and disconnection between the T phase of the alternating current power supply AC and the first power conversion module BR1, and relays R11' and R12' control connection and disconnection between the direct current power supply B and the first power conversion module BR1. Relays R31 and R32 control connection and disconnection between the S phase of the alternating current power supply and the second power conversion module BR2, and relays R31' and R32' control connection and disconnection between the direct current power supply B and the second power conversion module BR2.

In these embodiments, operating principles of the first and second power conversion modules BR1 and BR2 of the power converter are the same as that of the power conversion module BR in the foregoing embodiments. Details are not described herein again. In particular, when the mains supply fails, the direct current power supply may perform DC-DC conversion through at least one of the first and second power conversion modules BR1 and BR2. Using a plurality of power conversion modules for DC-DC conversion not only can improve the circuit utilization and reduce the load on the power conversion modules, but also can improve the power density of a system and reduce the costs.

Figure 9:
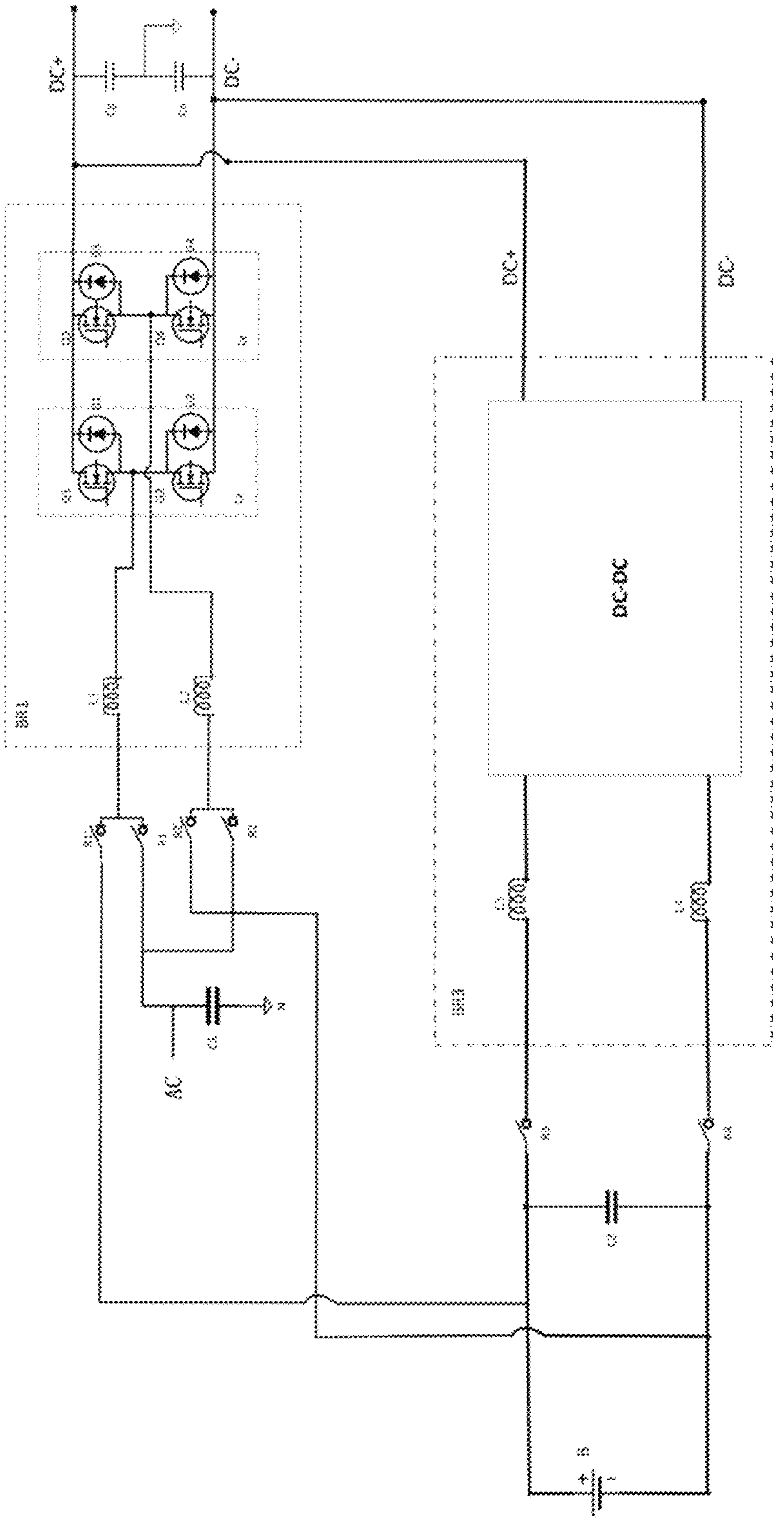
FIG. 9 is a circuit topology of a power converter according to some embodiments of the present inventive concept.

Further embodiments of the present inventive concept provide a power converter whose circuit topology is shown in FIG. 9. The power converter is configured to be electrically connected to an alternating current power supply AC (e.g., a mains supply) and a direct current power supply B (e.g., a rechargeable battery). The power converter includes a first power conversion module (rectifier module) BR1 and a third power conversion module (DC-DC conversion module) BR3. Relays R1 and R2 control connection and disconnection between the alternating current power supply AC and the rectifier module BR1, relays R1' and R2' control connection and disconnection between the direct current power supply B and the rectifier module BR1, and relays R3 and R4 control connection and disconnection between the direct current power supply B and the DC-DC conversion module BR3.

Specifically, a circuit topology of the rectifier module BR1 is the same as the circuit topology of the power conversion module BR shown in FIG. 1. Details are not described herein again.

The DC-DC conversion module BR3 includes a DC-DC converter and inductors L3 and L4 electrically connected to first and second terminals of the DC-DC converter, respectively. The inductors L3 and L4 are also electrically connected to positive and negative electrodes of the direct current power supply through the relays R3 and R4, respectively. Third and fourth terminals of the DC-DC converter are electrically connected to the positive direct current bus DC+ and the negative direct current bus DC−, respectively. The DC-DC converter is a bidirectional DC-DC converter. To be specific, the DC-DC converter can implement input at the first and second end terminals and output at the third and fourth terminals, and can also implement input at the third and fourth terminals and output at the first and second terminals. In these embodiments, the DC-DC converter uses a DC-DC transform topology and control logic that are well known in the art, and details are not described herein again.

Operating modes of the power converter in these embodiments are as follows:

Mains supply mode (the mains supply operates normally): The relays R1 and R2 are closed, the relays R1' and R2' are open, and the relays R3 and R4 are open. In this case, similarly to the foregoing embodiments, turn-on and turn-off of transistors Q1 to Q4 are controlled to implement AC-DC conversion, and the alternating current power supply charges direct current bus capacitors Cp and Cn.

Battery charging mode: If the rechargeable battery B is insufficiently charged, the rechargeable battery B needs to be charged. In this case, the relays R1 and R2 are closed, the relays R1' and R2' are open, and the relays R3 and R4 are closed. The direct current buses charge the rechargeable battery B through the DC-DC conversion module BR3.

Battery mode (the mains supply fails): The relays R1 and R2 are open, the relays R1' and R2' are closed, and the relays R3 and R4 are closed. In these embodiments, similarly to the foregoing embodiments, the turn-on and turn-off of the transistors Q1 to Q4 are controlled to implement DC-DC conversion, and the direct current power supply B supplies power to the direct current bus capacitors Cp and Cn. The DC-DC conversion module BR3 performs DC-DC conversion simultaneously, and the direct current power supply B charges the direct current bus capacitors Cp and Cn. In this way, the direct current power supply B supplies power to the direct current buses through both the first power conversion module BR1 and the third power conversion module BR3, which greatly improves power supply efficiency of the direct current power supply, reduces the load power of the DC-DC conversion module BR3, and significantly reduces the costs and the volume of the power converter. In addition, the DC-DC conversion module BR3 performing DC-DC conversion simultaneously further ensures continuity of power supply in a process of switching a transistor of the rectifier module BR1. In particular, when the rectifier module BR1 switches from a DC-DC conversion mode to a rectification mode, in a switching moment, the DC-DC conversion module BR3 carries the power supply of a load. In this case, the DC-DC conversion module BR3 may be overloaded by 150% to 200%, and an overloading capability of the transistors of the DC-DC conversion module BR3 may be selected according to an actual situation. In addition, if the DC-DC conversion is performed by only the rectifier module BR1, when the DC-DC conversion mode is switched to the rectification mode, the DC-DC conversion module BR3 may be powered up before the switching, and then function switching of the rectifier module BR1 is performed to ensure the continuity of power supply.

In particular, if the mains supply operates normally, the mains supply and the rechargeable battery B may jointly supply power to the direct current buses under a heavy-load condition.

The power converter in these embodiments can implement both AC-DC conversion and DC-AC conversion. The circuit topology is simple, the costs are low, the volume is small, the circuit utilization is high, and the loading capability is strong. In particular, when the power converter is applied to a UPS, the volume of the UPS can be significantly reduced and the costs of the UPS can be reduced, and the circuit utilization of the UPS can be improved.

Figure 10:
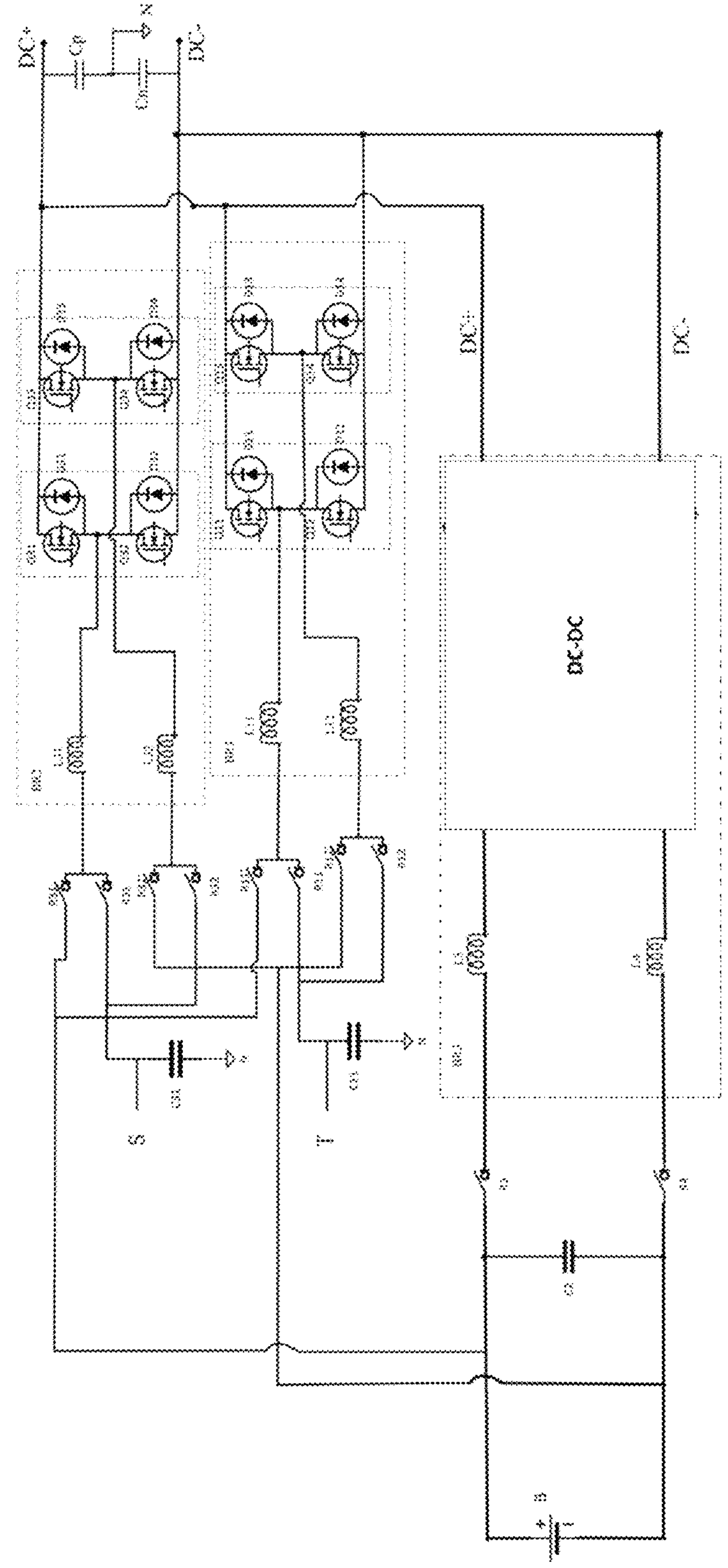
FIG. 10 is a circuit topology of a power converter according to some embodiments of the present inventive concept.

Still further embodiments of the present inventive concept provide a power converter whose circuit topology is shown in FIG. 10. The power converter is configured to be electrically connected to an alternating current power supply AC (e.g., a mains supply) and a direct current power supply B (e.g., a rechargeable battery). The power converter includes a first power conversion module (rectifier module) BR1, a second power conversion module (rectifier module) BR2, and a third power conversion module (DC-DC conversion module) BR3. Relays R11 and R12 control connection and disconnection between a T phase of the alternating current power supply AC and the rectifier module BR1, and relays R11' and R12' control connection and disconnection between the direct current power supply B and the rectifier module BR1. Relays R31 and R32 control connection and disconnection between an S phase of the alternating current power supply AC and the second power conversion module BR2, and relays R31' and R32' control connection and disconnection between the direct current power supply B and the second power conversion module BR2. Relays R3 and R4 control connection and disconnection between the direct current power supply B and the DC-DC conversion module BR3.

In these embodiments, operating principles of the first and second power conversion modules BR1 and BR2 of the power converter are the same as that of the power conversion module BR in the foregoing embodiments, and an operating principle of the third power conversion module BR3 is the same as that of the DC-DC conversion module in the foregoing embodiments. Details are not described herein again. In particular, when the mains supply fails, the direct current power supply may perform DC-DC conversion through at least one of the first and second power conversion modules BR1 and BR2, or perform DC-DC conversion through at least one of the first and second power conversion modules BR1 and BR2, and also perform DC-DC conversion through the third power conversion module BR3 simultaneously. Using a plurality of power conversion modules for DC-DC conversion not only can improve the circuit utilization and reduce the load on the power conversion modules, but also can improve the power density of a system and reduce the costs. In addition, performing DC-DC conversion by simultaneously using the third power conversion module BR3 can further ensure continuity of power supply in a transistor switching process.

Figure 11:
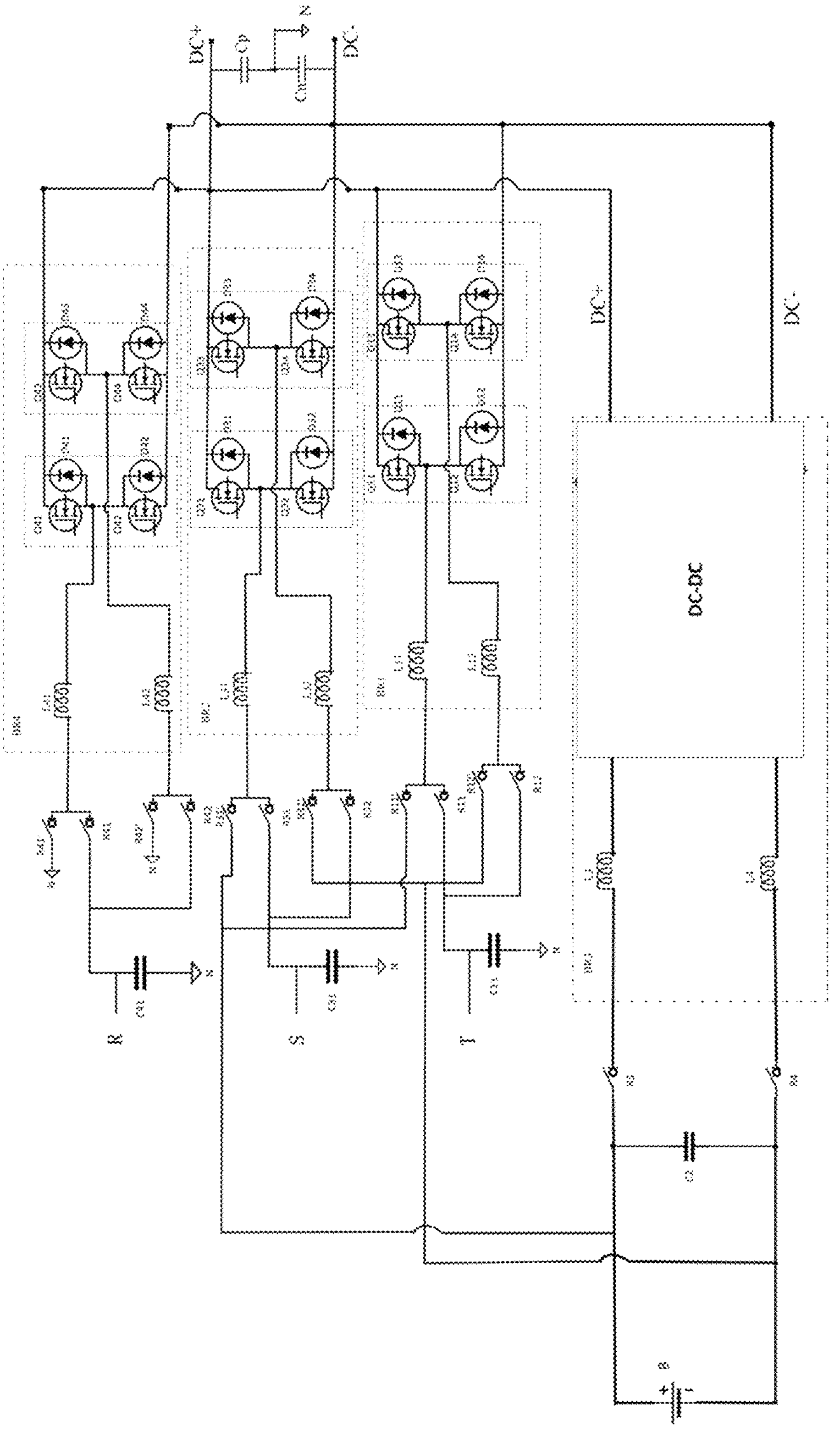
FIG. 11 is a circuit topology of a three-phase power converter according some embodiments of the present inventive concept.

Some embodiments of the present inventive concept provide a three-phase power converter whose circuit topology is shown in FIG. 11. A fourth power conversion module BR4 is added on the basis of the circuit topology shown in FIG. 10. The fourth power conversion module BR4 is a rectifier module whose circuit topology is the same as that of the first power conversion module BR1. The first, second, and fourth power conversion module BR1, BR2, and BR4 correspond to a T phase, an S phase, and an R phase of a three-phase alternating current power supply, respectively. The relays R11 and R12 control connection and disconnection between the T phase of the alternating current power supply AC and the first power conversion module BR1, and the relays R11' and R12' control connection and disconnection between the direct current power supply B and the first power conversion module BR1. The relays R3 and R4 control connection and disconnection between the direct current power supply B and the DC-DC conversion module BR3. The relays R31 and R32 control connection and disconnection between the S phase of the alternating current power supply AC and the second power conversion module BR2, and the relays R31' and R32' control connection and disconnection between the direct current power supply B and the second power conversion module BR2. The relays R41 and R42 control connection and disconnection between the R phase of the alternating current power supply AC and the fourth power conversion module BR4, and the relays R41' and R42' control connection and disconnection between the fourth power conversion module BR4 and the neutral line N.

In these embodiments, when the first, second, and fourth power conversion modules BR1, BR2, and BR4 of the power converter perform AC-DC conversion, their operating principles are the same, and are the same as the operating principle of the mains supply mode in the foregoing embodiments. A difference is that when the mains supply fails, the third power conversion module BR3 and at least two of the first, second, and fourth power conversion modules BR1, BR2, and BR4 are used by the direct current power supply to jointly perform DC-DC conversion. As shown in FIG. 11, the power conversion modules BR1, BR2, and BR3 are used to jointly perform DC-DC conversion. Those skilled in the art can understand that the four power conversion modules BR1 to BR4 may be used to jointly perform DC-DC conversion. Using a plurality of power conversion modules for DC-DC conversion not only can improve the circuit utilization and reduce the load on the power conversion modules, but also can improve the power density of a system and reduce the costs.

Generally, all loads cannot be completely balanced. Especially for a three-phase power supply, if only single-phase loads are carried, the system can become very unbalanced. In this case, it is necessary to control balance of the positive and negative direct current buses. In the battery mode, the fourth power conversion module BR4 is used as a balance branch, and transistors thereof are controlled to be alternately turned on, so that the balance of the direct current buses can be implemented. Specifically, as shown in FIG. 11, if a voltage of the capacitor Cp is higher than that of the capacitor Cn, a first bridge arm of the fourth power conversion module BR4 is used as an example for description. A second bridge arm and the first bridge arm have similar operating logic. When a transistor Q41 is turned on, a transistor Q42 is turned off, the relay R41' is closed, and the relay R41 is open, an inductor L41 stores energy, and then a current path is: DC+→Q41→L41→R41'→neutral line N→Cp. After the inductor L41 completes energy storage, the transistor Q41 is turned off, the transistor Q42 is turned on, the inductor L41 freewheels to release energy, and then a current path is: neutral line N→R41'→L41→Q42→DC−→Cn. That is, when the voltage of Bus+ (Cp) is higher than that of Bus− (Cn), the capacitor Cp discharges to store energy for the inductor L41, and the inductor L41 freewheels to release energy to the capacitor Cn. Similarly, if the voltage of the capacitor Cn is higher than that of the capacitor Cp, the second bridge arm of the fourth power conversion module BR4 is used as an example for description. The first bridge arm and the second bridge arm have similar operating logic. When a transistor Q44 is turned on, a transistor Q43 is turned off, the relay R42' is closed, and the relay R42 is open, an inductor L42 stores energy, and then a current path is: neutral line N→Cn→DC−→Q44→L42→R42'. After the inductor L42 completes energy storage, the transistor Q44 is turned off, the transistor Q43 is turned on, the inductor L42 freewheels to release energy, and then a current path is: neutral line N→R41'→L42→Q43→DC+→Cp. That is, when the voltage of Bus+ (Cn) is higher than that of Bus− (Cp), the capacitor Cn discharges to store energy for the inductor L42, and the inductor L42 freewheels to release energy to the capacitor Cp. In this way, the balance of the positive and negative direct current buses is implemented.

Figure 12:
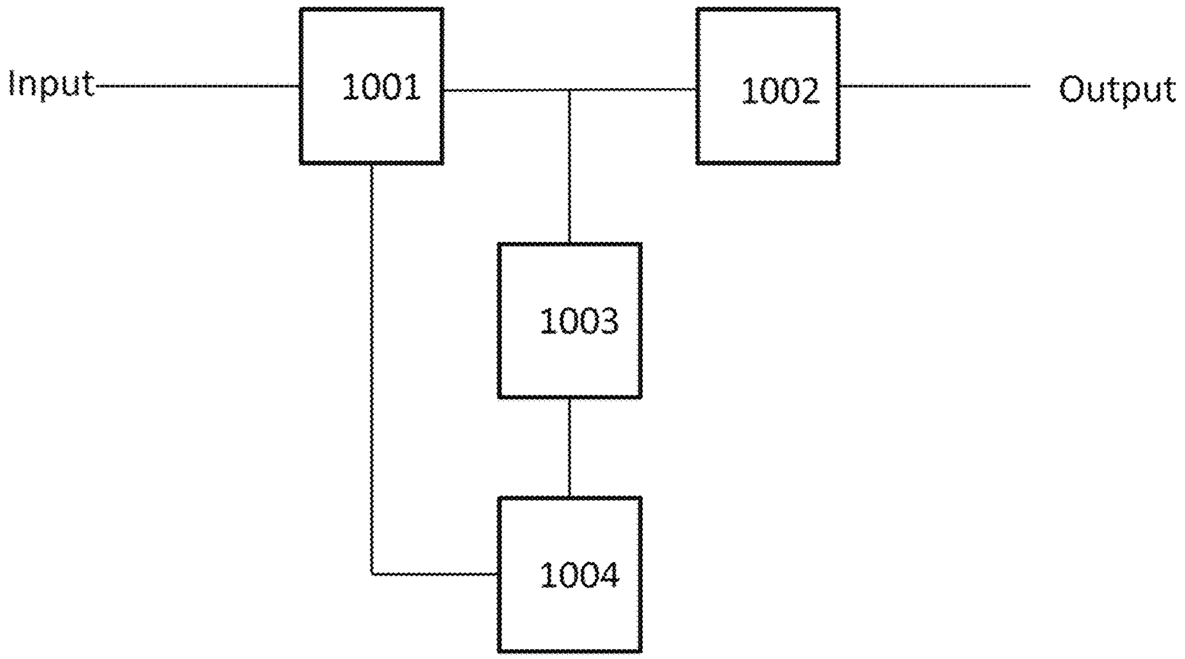
FIG. 12 is a structural block diagram of a UPS according to some embodiments of the present inventive concept.

Some embodiments of the present inventive concept provide a UPS. Referring to a structural block diagram of the UPS in these embodiments shown in FIG. 12, the UPS includes a power converter 1001, an inverter 1002, a battery charging module 1003, and a rechargeable battery 1004.

Compared with a conventional UPS, the power converter 1001 of the UPS in these embodiments can perform DC-DC conversion on an output of the rechargeable battery 1004 and then provide the output to a direct current bus, thereby omitting a dedicated battery discharging module, reducing the volume of the UPS, and saving the costs.

Figure 13:
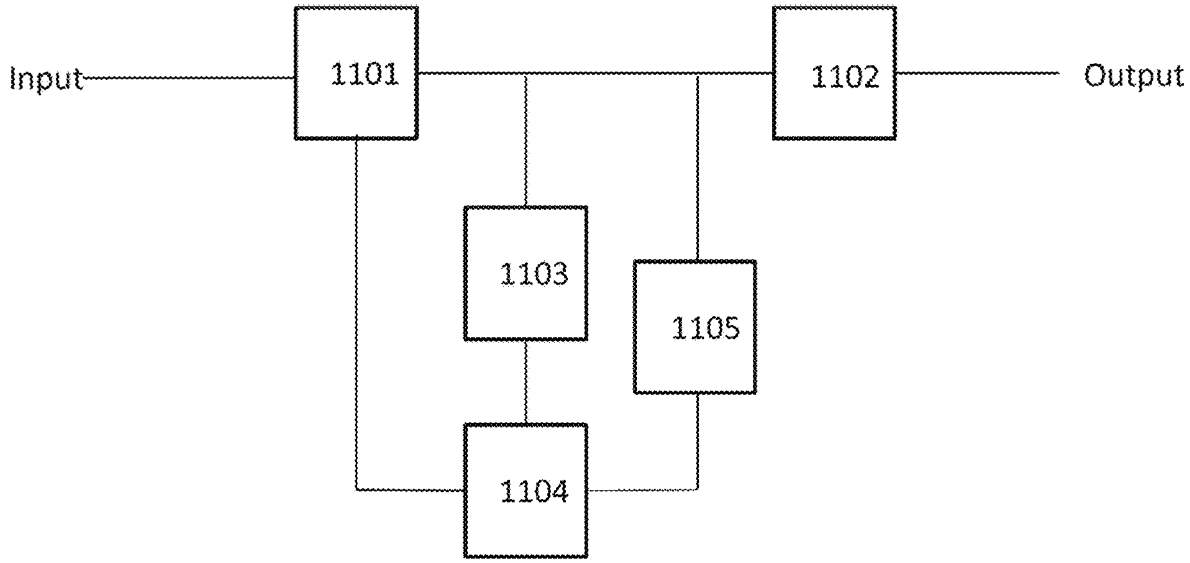
FIG. 13 is a structural block diagram of a UPS according to some embodiments of the present inventive concept.

Further embodiments of the present inventive concept provide another UPS. Referring to a structural block diagram of the UPS in these embodiments shown in FIG. 13, the UPS includes a power converter 1101, an inverter 1102, a battery charging module 1103, a rechargeable battery 1104, and a battery discharging module 1105. Compared with a conventional UPS, the UPS in these embodiments can supply power from the battery 1104 to a direct current bus by using both the battery discharging module 1105 and the power converter 1101, thereby improving battery power supply efficiency. The battery charging module 1103 and the battery discharging module 1105 are replaced with a bidirectional DC-DC conversion module, thereby reducing the volume of the UPS and saving the costs.

The power converters in the embodiments of the present inventive concept can implement different operating modes by controlling switches. Therefore, the UPSs in the embodiments of the present inventive concept can directly convert a battery output by a rectifier module or a battery conversion module to supply power to the direct current bus at low load, and convert the battery output by both the rectifier module and the battery conversion module to supply power to the direct current bus at high load. Therefore, the UPSs in the present inventive concept have a wider range of application scenarios.

According to other embodiments of the present inventive concept, a relay may be replaced with another switching element, for example, a mechanical switch, a circuit breaker, or the like. In addition, relay components (R11, R11'), (R12, R12'), (R31, R31'), (R32, R32'), (R41, R41'), and (R42, R42') may be replaced with single-pole double-throw switches.

According to other embodiments of the present inventive concept, an N-type MOSFET transistor may be replaced with another transistor, for example, a P-type MOSFET transistor or an IGBT transistor.

Although the present inventive concept has been described by using various embodiments, the present inventive concept is not limited to the embodiments described herein, and includes various changes and variations without departing from the scope of the present inventive concept.

What is claimed is:

1. A power converter, comprising: a first switching module, a second switching module, a first power conversion module, and a second power conversion module, each of the first power conversion module and the second power conversion module comprising two bridge arms, wherein the first switching module is configured to cause an input terminal of the first power conversion module to be selectively electrically connected to a direct current power supply or a first phase of an alternating current power supply, the second switching module is configured to cause an input terminal of the second power conversion module to be selectively electrically connected to the direct current power supply or a second phase of the alternating current power supply, and each of the first power conversion module and the second power conversion module is configured to selectively perform AC-DC conversion and DC-DC conversion, wherein the AC-DC conversion is performed by the two bridge arms independently to supply power to a direct current bus from the alternating current power supply, and the DC-DC conversion is performed by the two bridge arms cooperatively to supply power to the direct current bus from the direct current power supply.

2. The power converter of claim 1, further comprising a third switching module and a third power conversion module, wherein the third power conversion module is a DC-DC conversion module, the third switching module is configured to control connection and disconnection between the direct current power supply and an input terminal of the third power conversion module, and an output terminal of the third power conversion module is electrically connected to the direct current bus.

3. The power converter of claim 2, comprising a heavy-load operating mode, wherein when the alternating current power supply is normal, under a heavy-load condition, the first power conversion module and the second power conversion module are configured to perform AC-DC conversion, while the third power conversion module is configured to perform DC-DC conversion, and the alternating current power supply and the direct current power supply jointly supply power to the direct current bus.

4. The power converter of claim 2, wherein when the alternating current power supply is abnormal, at least one of the first power conversion module and the second power conversion module is configured to perform DC-DC conversion; or, when the alternating current power supply is abnormal, at least one of the first power conversion module and the second power conversion module is configured to perform DC-DC conversion, while the third power conversion module is configured to perform DC-DC conversion.

5. The power converter of claim 2, wherein during a switching period when the first power conversion module and the second power conversion module are configured to switch from DC-DC conversion to AC-DC conversion, the third power conversion module is configured to perform DC-DC conversion.

6. The power converter of claim 2, further comprising a fourth switching module and a fourth power conversion module, the fourth power conversion module comprising two bridge arms, wherein the fourth switching module is configured to cause an input terminal of the fourth power conversion module to be selectively electrically connected to a neutral line or a third phase of the alternating current power supply, and the fourth power conversion module is configured to cause the two bridge arms thereof to independently perform AC-DC conversion, to supply power to the direct current bus from the third phase of the alternating current power supply, or configured to cause the two bridge arms thereof to independently perform balancing of the direct current bus.

7. The power converter of claim 6, wherein the first power conversion module, the second power conversion module, or the fourth power conversion module comprises a first bridge arm, a second bridge arm, a first inductor, and a second inductor, wherein the first bridge arm comprises a first transistor and a second transistor connected in series, and a node between the first transistor and the second transistor is electrically connected to a first terminal of the first inductor;

the second bridge arm is connected in parallel with the first bridge arm and comprises a third transistor and a fourth transistor connected in series, and a node between the third transistor and the fourth transistor is electrically connected to a first terminal of the second inductor;

a second terminal of the first inductor and a second terminal of the second inductor are input terminals of the first power conversion module, the second power conversion module, or the fourth power conversion module; and a node between the first transistor and the third transistor is electrically connected to a positive electrode of the direct current bus, and a node between the second transistor and the fourth transistor is electrically connected to a negative electrode of the direct current bus.

8. The power converter of claim 7, wherein the first transistor and the second transistor are configured to be alternately turned on, or the third transistor and the fourth transistor are configured to be alternately turned on, thereby performing the AC-DC conversion.

9. The power converter of claim 7, wherein the first transistor and the fourth transistor of the first power conversion module or the second power conversion module are configured to be turned on, while the second transistor and the third transistor of the first power conversion module or the second power conversion module are configured to be turned off, thereby performing the DC-DC conversion; or the second transistor and the third transistor of the first power conversion module or the second power conversion module are configured to be turned on, while the first transistor and the fourth transistor of the first power conversion module or the second power conversion module are configured to be turned off, thereby performing the DC-DC conversion.

10. An uninterruptible power supply, comprising the power converter according to claim 1.

* * * * *